United States Patent [19]

Lutteke et al.

[11] 4,350,222
[45] Sep. 21, 1982

[54] VARIABLE TREAD VEHICLE

[76] Inventors: Martin T. Lutteke; Gordon M. Lutteke, both of Rte. 1, Wells, Minn. 56097

[21] Appl. No.: 133,466

[22] Filed: Mar. 24, 1980

[51] Int. Cl.³ .......................................... B62D 61/00
[52] U.S. Cl. ............................ 180/209; 180/DIG. 2; 280/638
[58] Field of Search ................ 180/209, 9.48, DIG. 2; 280/638

[56] References Cited

U.S. PATENT DOCUMENTS

| | | | |
|---|---|---|---|
| 1,179,066 | 4/1916 | Bates | 180/DIG. 2 |
| 1,374,412 | 4/1921 | Waterman et al. | 180/DIG. 2 |
| 1,811,661 | 6/1931 | Beatty et al. | 180/309 X |
| 1,967,283 | 7/1934 | Brown | 180/209 |
| 2,002,002 | 5/1935 | Brown et al. | 180/209 |
| 2,173,419 | 9/1939 | Johnson | 180/209 X |
| 2,228,454 | 1/1941 | Hamilton | 180/209 |
| 2,248,080 | 7/1941 | Hathaway | 180/DIG. 2 |
| 2,535,762 | 12/1950 | Tapp et al. | 180/DIG. 2 |
| 2,681,231 | 6/1954 | Kondracki | 180/9.48 |
| 2,885,018 | 5/1959 | Jackson | 180/209 X |
| 3,306,390 | 2/1967 | Jamme | 180/309 |
| 3,589,744 | 6/1971 | Hansen | 180/309 X |
| 3,966,220 | 6/1976 | Forsyth et al. | 280/638 |

FOREIGN PATENT DOCUMENTS 694400 10/1979 U.S.S.R. ............................ 180/209

OTHER PUBLICATIONS

Operator's Manual, 6000 Hi-Cycle Sprayer, Deere & Co., pp. 3, 30 & 31.

*Primary Examiner*—John A. Pekar
*Attorney, Agent, or Firm*—Kinney, Lange, Braddock, Westman and Fairbairn

[57] ABSTRACT

A variable tread vehicle includes first and second parallel horizontal rails which are connected to a frame and extend in a direction which is transverse to the direction of movement of the vehicle. First and second movable carriages are movable on sections of the track formed by the rails. A first drop axle is connected to and extends downward from the first movable carriage, and a second drop axle is connected to and extends downward from the second movable carriage. Connected near the lower ends of the first and second drop axles are first and second wheels of the vehicle. The first and second movable carriages are moved on the track by first and second threaded drive shafts, which are driven by hydraulic motors. By controlling the hydraulic motors, the operator can drive the first and second movable carriages outward to increase the spacing between the first and second wheels, or can drive the first and second movable carriages inward to decrease the spacing between the first and second wheels. The adjustment of wheel spacing may be accomplished while driving the vehicle, thus permitting a rapid and simple changeover when different wheel spacing is required.

11 Claims, 7 Drawing Figures

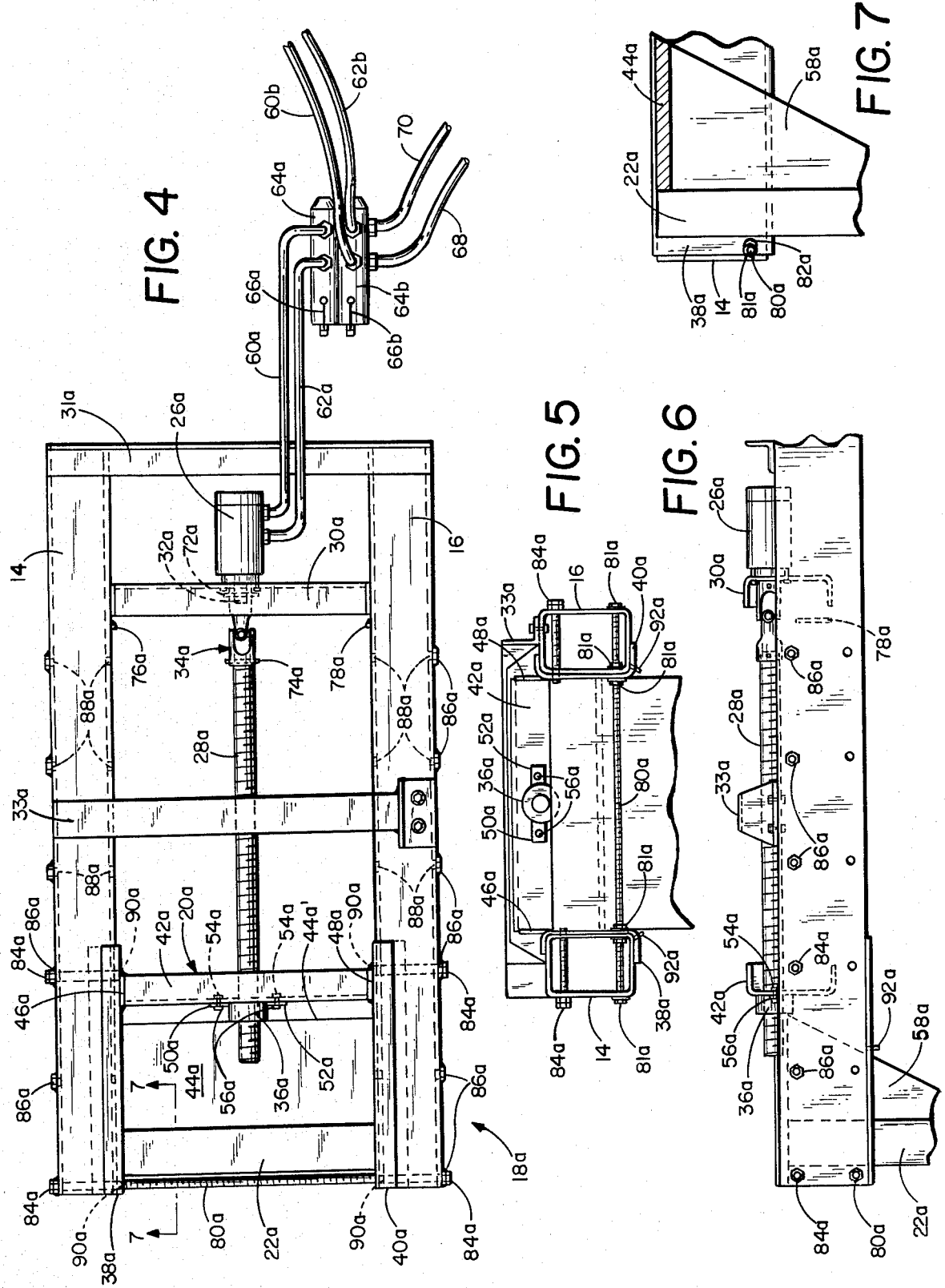

VARIABLE TREAD VEHICLE

BACKGROUND OF THE INVENTION

1. Field of the Invention

The present invention relates to variable tread vehicles in which spacing between a pair of wheels is adjustable.

2. Description of the Prior Art

With various types of farm and construction vehicles, it is desirable to be able to change the spacing between wheels or threads in order to accommodate different working conditions. This is particularly true in the case of farm vehicles, which often must be used in conjunction with different types of crops having different row spacing. One type of agricultural vehicle which provides an adjustment of wheel tread is the John Deere 6000 Hi-Cycle sprayer. This vehicle has a pair of rear wheels which are driven by chain drives through a pair of drop axle assemblies. The wheel tread (or spacing) of the 6000 Hi-Cycle sprayer is adjustable by jacking up one side of the vehicle, removing several bolts which attach the drop axle to a pair of rails, and prying the drop axle inward or outward using a pry bar which extends through a hole in the deck and through a tab in the top of the drop axle housing. Once the selected new position of the drop axle has been attained, the bolts must be reinserted and tightened. The same procedure is then repeated with the opposite drop axle assembly.

This type of manual adjustment of wheel tread is inconvenient, and requires several hours of time. This results in lost production time of both the operator and the vehicle each time a field having a different row spacing is to be sprayed.

In the past, various types of tractors and other farm vehicles, as well as construction vehicles, have been proposed which have some form of mechanically adjustable tread. For example, in the Beatty U.S. Pat. No. 1,811,661, a rack-and-pinion type of arrangement is used to change tread.

In the Brown U.S. Pat. No. 1,967,283, a tractor is shown which has oppositedly threaded shafts. An axle housing has internally threaded portions which engage the threaded shafts. Adjustment of the spacing between the wheels can be achieved by driving the tractor either forwardly or backwardly.

The Brown et al U.S. Pat. No. 2,002,002 shows a rack-and-pinion arrangement for changing wheel tread.

The Johnson U.S. Pat. No. 2,173,419 changes tread through a gear which drives left and righthand treaded end portions into treaded bores of a pair of slide blocks. The slide blocks slide within a barrel and have wheel spindles attached at their ends.

The Hamilton U.S. Pat. No. 2,228,454 shows a telescoping type of arrangement in which the spacing of opposite sides of the tractor, and thus the tractor tread, can be adjusted.

The kondracki U.S. Pat. No. 2,681,231 shows a trench digger having an adjustable tread. Adjustment of the tread is achieved by removing fastening screws from the ends of the axle section and either a hydraulic mechanism is used to separate the tread, or a threaded shaft is used.

The Jackson U.S. Pat. No. 2,885,018 uses a threaded shaft to adjust the tread of a tractor.

The Jamme U.S. Pat. No. 3,306,390 shows a vehicle in which the wheels are supported on pivotable arms. The position of the four arms of the vehicle are controlled by hydraulic cylinders.

The Hansen U.S. Pat. No. 3,589,744 shows a telescoping type of arrangement for adjusting the tread of the wheels of a three-wheeled farm vehicle.

There is a continuing need, however, for improved adjustable wheel tread vehicles which provide rapid and simple change of wheel tread without requiring a large number of components which increase the cost of the vehicle significantly and reduce its reliability.

SUMMARY OF THE INVENTION

The present invention is a variable tread vehicle having a frame with first and second parallel horizontal rails connected. The rails extend transverse to the direction of motion of the vehicle to define a track. First and second movable carriage means move on first and second sections of track, respectively. Connected to the first and second movable carriage means are first and second drop axle means, respectively. First and second wheels are connected to the first and second drop axle means proximate their lower ends. The first and second movable carriage means are driven by first and second threaded drive shafts, respectively. Motor means rotate first and second shafts, to move the first and second movable carriage means on the first and second sections of the track, and thereby vary the spacing between the first and second wheels.

BRIEF DESCRIPTION OF THE DRAWINGS

FIG. 4 is a top view of a portion of the variable tread vehicle of FIG. 1.

FIG. 5 is an end view of the apparatus of FIG. 4.

FIG. 6 is a front view of the apparatus of FIG. 4.

FIG. 7 is a sectional view along line 7—7 of FIG. 4.

DETAILED DESCRIPTION OF THE PREFERRED EMBODIMENTS

The preferred embodiment of the present invention, as illustrated in FIGS. 1-7 is illustrated as a modification of and improvement to a John Deere 6000 Hi-Cycle sprayer. It should be realized, however, that the present invention is equally applicable to other forms of agricultural and construction vehicles which require variable tread.

Figure 1:
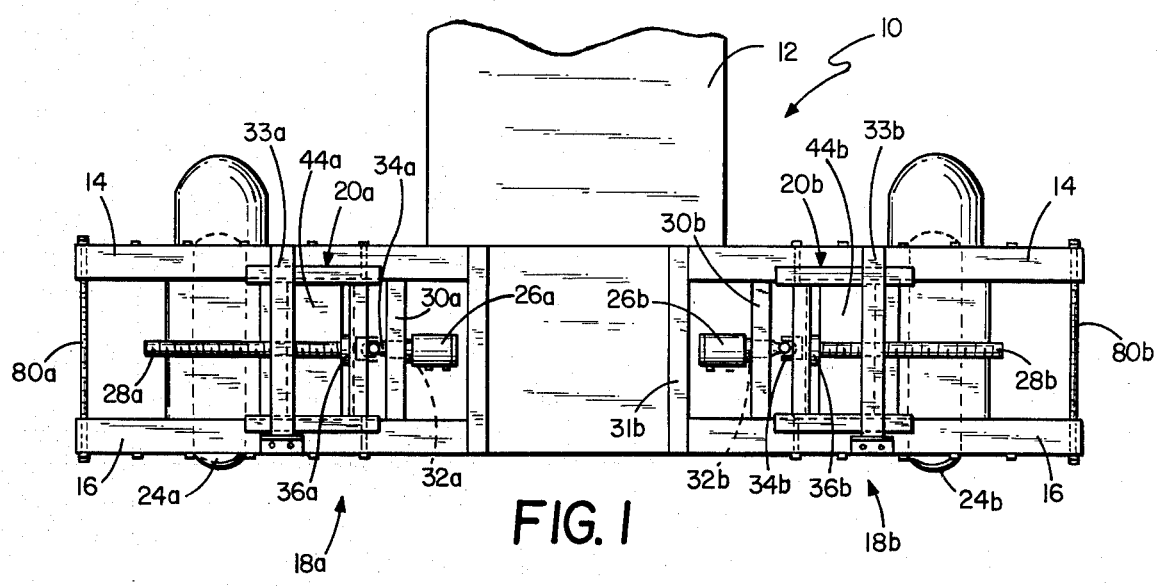
FIGS. 1 and 2 are top views of a variable tread vehicle of the present invention with the wheels shown at their narrowest and at their widest spacing, respectively.
Figure 2:
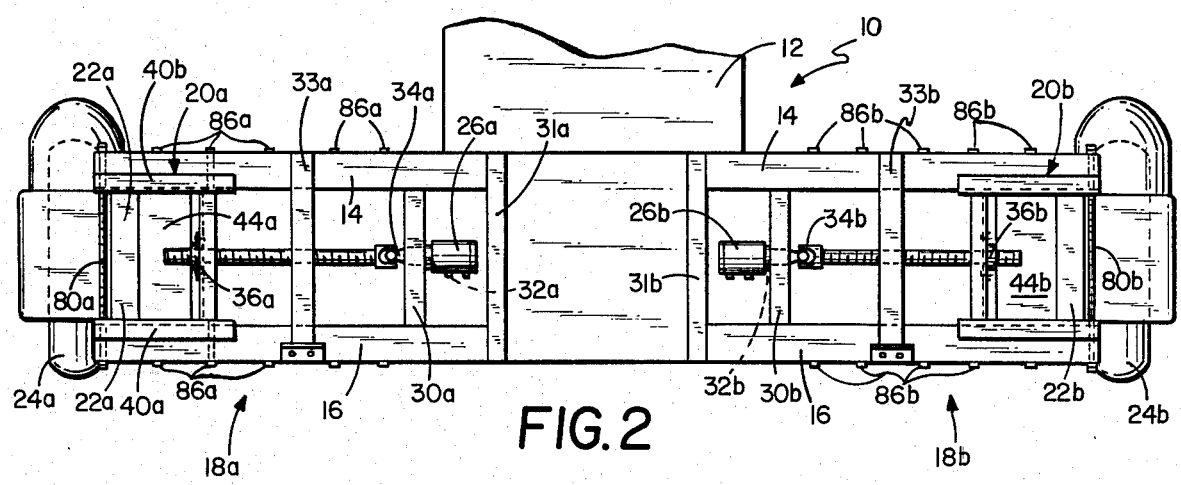
Figure 3:
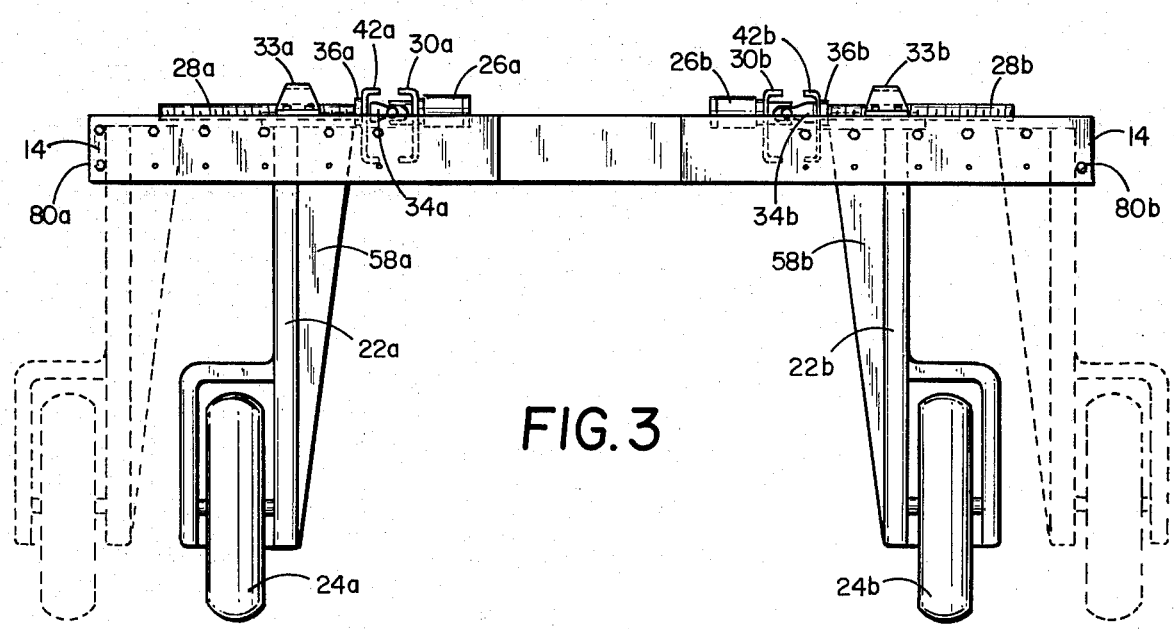
FIG. 3 is a rear view of the vehicle shown in FIGS. 1 and 2 with the wheels shown in solid lines at their narrowest spacing and in phantom at their widest spacing.

FIGS. 1 and 2 show top views of the rear end of vehicle 10, which has a frame 12 extending forward to which front wheels (not shown) are mounted.

Connected to frame 12 are a pair of horizontal parallel rails 14 and 16, which extend in a direction which is transverse to the direction of motion of vehicle 10. Rails 14 and 16 define a track having a left section 18a and a right section 18b.

The variable tread apparatus of the present invention includes a pair of movable carriages 20a and 20b which extend between rails 14 and 16 and are movable on track sections 18a and 18b, respectively. Connected to and extending downward from movable carriages 20a and 20b are drop axle assemblies 22a and 22b, respectively. Rear wheels 24a and 24b are mounted at the lower ends of drop axle assemblies 22a and 22b, and are driven by chain drives (not shown) within drop axle assemblies 22a and 22b. For the purpose of simplicity in illustration, the drive assemblies, which drive the chain drives of drop axle assemblies 22a and 22b, are not shown in the Figures. These assemblies, may be, for example, of the type used on the John Deere 6000 Hi-Cycle sprayer.

The position of carriages 20a and 20b, and thus the spacing between wheels 24a and 24b, may be varied by hydraulic drive motors 26a and 26b and drive shafts 28a and 28b, respectively. Motor 26a is fixedly attached to cross brase 30a, which extends between rails 14 and 16. Output shaft 32a of motor 26a is coupled through universal joint 34a to drive shaft 28a. The rotational drive of drive shaft 28a is converted to linear motion of carriage 20a by shaft nut 36a, which fixedly attached to movable carriage 20a. As shaft 28a rotates in one direction, shaft nut 36a drives carriage 28 outward from its innermost position shown in FIG. 1 toward its outermost position shown in FIG. 2. When shaft rotation is reversed, carriage 20a is driven inward.

The position of carriage 20b is controlled in a similar manner. Motor 26b is fixedly attached to cross brace 30b, which extends between rails 14 and 16. Output shaft 32b of motor 26b is coupled to drive shaft 28b by universal joint 34b. Shaft nut 36b is attached to movable carriage 20b an converts the rotation of shaft 28b to linear motion of carriage 20b along track section 18b.

In addition to braces 30a and 30b braces 31a and 31b, and braces 33a and 33b also extend between rails 14 and 16 to maintain rails 14 and 16 parallel to one another. As best shown in FIG. 5, brace 33a (and brace 33b) is in the form of an arch between rails 14 and 16 in order to permit carriage 20a (20b) to move on the track without interference from brace 33a (33b).

FIGS. 4–7 show one half of the variable tread apparatus of the present invention. The elements of the apparatus shown in FIGS. 4–7 will be designated with a numeral followed by the letter "a". For ease of description, only the apparatus will be discussed in detail. It should be realized, however, that the other half of the apparatus is identical and a mirror image, and similar elements are designated with a similar numeral, followed by the letter "b".

Carriage 20a includes a pair of C shaped slides 38a and 40a, brace 42a, and plate 44a. Slides 38a and 40a conform to a slide over the inner surfaces of slide rails 14 and 16, which are preferably hollow rectangular tubes. Brace 42a extends transversely between slides 38a and 40a and is attached, such as by welding, to slides 38a and 40a. Gussets 46a and 48a strengthen the connection between slides 38a and 40a and brace 42a.

Shaft nut 36a is connected to brace 42a by a pair of ears 50a and 52a, which are attached by welding to nut 36a and which are connected to cross brace 42a by bolts and nuts 54a and 56a. Shaft nut 36a also is in contact with edge 44a' of plate 44a. Therefore, when drive shaft 28a rotates in one direction, shaft nut 36a pushes against plate 44a to move carriage 20a outward. When drive shaft 28a is rotated in an opposite direction, shaft nut 36a pushes against brace 42a to move carriage 20a inward.

Plate 44a extends between slides 38a and 40a to maintain the desired separation of slides 38a and 40a. Drop axle assembly 22a is attached by welding to slides 38a and 40a and to plate 44a. Gussets 58a strengthen the connection between drop axle assembly 22a and movable carriage 20a.

In the embodiment shown in the Figures, hydraulic motor 26a is a hydraulic orbit motor which is powered by hydraulic fluid provided on lines 60a and 62a. Hydraulic motor 26a is controlled by hydraulic valve 64a, which has a control lever 66a. A similar hydraulic valve 64b, with a control lever 66b, is also shown in FIG. 4. Hydraulic fluid is supplied to valves 64a and 64b by hydraulic lines 68 and 70, which are connected to the hydraulic system (not shown) of the vehicle. Also shown in FIG. 4 are hydraulic lines 60b and 62b, which connect valve 62b with hydraulic orbit motor 26b (shown in FIGS. 1-3).

Output shaft 32a of motor 26a is connected to shaft 28a by universal joint 34a. Roll pin 72a connects shaft 32a to one end of universal joint 34a, while roll pin 74a connects the opposite end of universal joint 34a with threaded shaft 28a.

The movement of carriage 20a on track section 18a is limited at both the inner and outer ends. Stops 76a and 78a are attached to inner surfaces of rails 14 and 16 and engage the inner edges of slides 38a and 40a as carriage 20a reaches its innermost position (shown in FIG. 1). Ready bolt 80a extends between the ends of rails 14 and 16 and is attached to rails 14 and 16 by nuts 81a. The outer ends of slides 38a and 40a have notches 82a which engage ready bolt 80a as carriage 20a reaches its outermost position (as best shown in FIG. 7). Ready bolt 80a, therefore, acts as an outer stop to prevent carriage 20a from being driven off the end of track 18a.

As discussed previously, the position of carriage 20a along track section 18a is adjustable by means of motor 26a and drive shaft 28a. Once the proper position of carriage 20a has been selected, carriage 20a is held in position by doll bolts 48a. As shown in the Figures, nuts 86a are welded on the outer sides of rails 14 and 16 at spaced locations. Holes 88a in rails 14 and 16 are aligned with welded nuts 86a and permit doll bolts 84a to be threaded through nuts 86a and extend through rails 14 and 16. Slides 38a and 40a have detents 90a formed in their inner surface. When carriage 20a is properly positioned for a particular row spacing, doll bolts 84a extend through a nut 86a, through holes 88a and engage detents 90a. This provides a smple method of aligning and holding carriage 20a in place. When wheel spacing is to be changed, doll bolts 84a are loosened sufficiently so that their ends disengage the detents in slides 38a and 40a, and carriage 20a is then permitted to be moved. It is not necessary to completely remove doll bolts 84a prior to moving carriage 20a. In the preferred embodiment shown in the Figures only a selected number of welded nuts 86a are shown, which correspond to certain commonly used wheel spacings. It should be understood, however, that other or additional welded nuts 86a may be provided for other desired wheel spacings.

In order to lubricate slides 38a and 40a, grease exserts 92a are provided, as best shown in FIGS. 5 and 6. Exserts 92a permit grease to be injected between slide 38a and rail 14 and between slide 40a and rail 16. In view of the environment in which the vehicle must operate, a reliable means of lubrication of slides 38a and 40a is very important.

In conclusion, the present invention is an improved vehicle which provides variable wheel tread or spacing automatically. The changeover from one wheel spacing to the other is achieved quickly, and with a minimum of effort on the part of the operator. The operator merely must loosen doll bolts 84a and 84b to permit movement of carriages 20a and 20b, and then operate hydraulic motors 26a and 26b in the desired direction while driving the vehicle slowly until the desired spacing is achieved. At that point, doll bolts 84a and 84b corresponding to the desired location are tightened and the vehicle is ready for operation with the new wheel spacing. Lost production time of both the operator and the vehicle is minimized, in contrast to the difficult and time-consuming changeover in prior art drop axle vehicles such as the John Deere 6000 Hi-Cycle sprayer.

Although the present invention has been described with reference to preferred embodiments, workers skilled in the art will recognize that changes may be made in form and detail without departing from the spirit and scope of the invention.

What is claimed is:

1. A variable tread vehicle comprising:
   a frame;
   first and second parallel horizontal rails connected to the frame and extending transverse to a direction of movement of the vehicle to define a track; wherein the first and second rails comprise hollow tubes having generally rectangular cross-sections;
   first movable carriage means movable on a first section of the track; the first movable carriage means comprising: first and second slides of C-shaped cross-section for partially surrounding the first and second rails, respectively, for slidable movement thereon;
   first brace means attached to and extending between the first and second slides, the first brace means having a substantially vertical portion;
   first internally threaded means carried by the substantially vertical portion of the first brace means wherein the first internally threaded means is a first shaft nut attached to the vertical portion of the first brace means and an edge of the first plate means is in abutment with the first shaft nut; and
   first generally horizontal plate means attached to and extending between the first and second slides;
   second movable carriage means movable on a second section of the track; the second movable carriage means comprising:
   third and fourth slides of C-shaped cross-section for partially surrounding the first and second rails, respectively, for slidable movement thereon;
   second brace means attached to and extending between the third and fourth slides, the second brace means having a substantially vertical portion;
   second internally threaded means carried by the substantially vertical portion of the second brace means wherein the second internally threaded means is a second shaft nut attached to the vertical portion of the second brace means and an edge of the second plate means is in abutment with the second shaft nut; and
   second generally horizontal plate means attached to and extending between the third and fourth slides;
   first drop axle means attached to the first and second slides and the first plate means of the first movable carriage means proximate its upper end and extending downward;
   first gusset means attached to and extending between the first drop axle means and the first plate means;
   second drop axle means attached to the third and fourth slides and the second plate means of the second movable carriage means proximate its upper end and extending downward;
   second gusset means attached to and extending between the second drop axle means and the second plate means;
   a first wheel connected to the first drop axle means proximate its lower end;
   a second wheel connected to the second drop axle means proximate its lower end; first internally threaded means for driving the first movable carriage means on the first section of the track;
   a first threaded drive shaft extending through the internally threaded means for driving the first movable carriage means on the first section of the track;
   a second threaded drive shaft extending through the second internally threaded means for driving the second movable carriage means on the second section of the track;
   motor means for rotating the first and second shafts to move the first and second movable carriage means on the first and second sections of the track, and thereby vary the spacing between the first and second wheels; and
   first and second arch braces attached to and extending between the first and second rails at positions along the first and second sections of the track for maintaining the first and second rails in fixed relationship with respect to one another while permitting movement of the first and second carriage means on the first and second sections of track, respectively, without interference from the first and second arch braces.

2. The variable tread vehicle of claim 1 and further comprising:
   grease exsert means for supplying lubricating grease between the C-shaped slides and the first and second rails.

3. The variable tread vehicle of claim 1 wherein the first and second rails have a plurality of position defining holes extending therethrough and wherein the first, second, third and fourth slides have positioning detent means for receiving an end of a positioning member inserted through selected holes of the plurality of holes in the rails.

4. The variable tread vehicle of claim 1 and further comprising first and second brace members attached to and extending between the first and second parallel horizontal rails, and wherein the motor means comprises a first motor mounted on the first brace member and a second motor mounted on the second brace member.

5. The variable tread vehicle of claim 4 and further comprising a first universal joint for connecting an output shaft of the first motor with the first threaded drive shaft; and a second universal joint for connecting an output shaft to the second motor with the second threaded drive shaft.

6. A variable tread vehicle comprising:
   a frame;
   first and second parallel horizontal rails connected to the frame and extending transverse to a direction of movement of the vehicle to define a track and having a plurality of position defining holes extending therethrough and means having internal threads in coaxial alignment with the positioning holes;

first movable carriage means movable on a first section of the track having first positioning detent means;
second movable carriage means movable on a second section of the track having second positioning detent means;
positioning bolts having threads and a detent engaging end, the bolts being threadably inserted through the means having internal threads and the positioning holes to engage the first and second detent means of the first and second movable carriage means;
first drop axle means connected to the first movable carriage means proximate its upper end and extending downward;
second drop axle means connected to the second movable carriage means proximate its upper end and extending downward;
a first wheel connected to the first drop axle means proximate its lower end;
a second wheel connected to the second drop axle means proximate its lower end;
a first threaded drive shaft for driving the first movable carriage means on the first section of the track;
a second threaded drive shaft for driving the second movable carriage means on the second section of the track;
motor means for rotating the first and second shafts to move the first and second movable carriage means on the first and second sections of the track, and thereby vary the spacing between the first and second wheels;
first and second inner stop means attached to the first and second parallel horizontal rails for engaging the first and second movable carriage means, respectively, to define innermost positions of the first and second movable carriage means on the first and second sections of track, respectively; and
first and second outer stop means attached to the first and second rails proximate their outer ends for engaging the first and second movable carriage means, respectively, to define outermost positions of the first and second movable carriage means on the first and second sections of track, respectively, wherein the first and second outer stop means include first and second stop members connected to and extending between the first and second rails proximate their outer ends.

7. The variable tread vehicle of claim 6 wherein the first and second outer stop means comprise first and second members connected to and extending between the first and second rails proximate their outer ends.

8. The variable tread vehicle of claim 7 wherein the first and second movable carriage means includes notch means for engaging the first and second members.

9. A variable tread vehicle comprising:
a frame;
first and second parallel horizontal rails connected to the frame and extending transverse to a direction of movement of the vehicle to define a track and having a plurality of position defining holes extending therethrough and means having internal threads in coaxial alignment with the positioning holes;
first movable carriage means movable on a first section of the track having first positioning detent means;
second movable carriage means movable on a second section of the track having second positioning detent means;
positioning bolts having threads and a detent engaging end, the bolts being threadably inserted through the means having internal threads and the positioning holes to engage the first and second detent means of the first and second movable carriage means;
first drop axle means connected to the first movable carriage means proximate its upper end and extending downward;
second drop axle means connected to the second movable carriage means proximate its upper end and extending downward;
a first wheel connected to the first drop axle means proximate its lower end;
a second wheel connected to the second drop axle means proximate its lower end;
a first threaded drive shaft for driving the first movable carriage means on the first section of the track;
a second threaded drive shaft for driving the second movable carriage means on the second section of the track;
first hydraulic motor means for rotating the first shaft to move the first movable carriage means on the first section of the track;
second hydraulic motor means for rotating the second shaft to move the second movable carriage means on the second section of the track; and
manually actuated hydraulic control means for selectively operating the first and second hydraulic motor means to vary the spacing between the first and second carriage means, and thus the spacing between the first and second wheels.

10. A variable tread vehicle comprising:
a frame;
first and second parallel horizontal rails connected to the frame and extending transverse to a direction of movement of the vehicle to define a track; wherein the first and second rails comprise hollow tubes having generally rectangular cross-sections;
first movable carriage means movable on a first section of the track; the first movable carriage means comprising:
first and second slides of C-shaped cross-section for partially surrounding the first and second rails, respectively, for slidable movement thereon;
first brace means attached to and extending between the first and second slides, the first brace means having a substantially vertical portion;
first internally threaded means carried by the substantially vertical portion of the first brace means; and
first generally horizontal plate means attached to and extending between the first and second slides;
second movable carriage means movable on a second section of the track; the second movable carriage means comprising:
third and fourth slides of C-shaped cross-section for partially surrounding the first and second rails, respectively, for slidable movement thereon;
second brace means attached to and extending between the third and fourth slides, the second brace means having a substantially vertical portion;

second internally threaded means carried by the substantially vertical portion of the second brace means; and second generally horizontal plate means attached to and extending between the third and fourth slides;

first drop axle means attached to the first and second slides and the first plate means of the first movable carriage means proximate its upper end and extending downward;

first gusset means attached to and extending between the first drop axle means and the first plate means;

second drop axle means attached to the third and fourth slides and the second plate means of the second movable carriage means proximate its upper end and extending downward;

second gusset means attached to and extending between the second drop axle means and the second plate means;

a first wheel connected to the first drop axle means proximate its lower end;

a second wheel connected to the second drop axle means proximate its lower end;

a first threaded drive shaft extending through the first internally threaded means for driving the first movable carriage means on the first section of the track;

a second threaded drive shaft extending through the second internally threaded means for driving the second movable carriage means on the second section of the track;

motor means for rotating the first and second shafts to move the first and second movable carriage means on the first and second sections of the track, and thereby vary the spacing between the first and second wheels;

first and second arch braces attached to and extending between the first and second rails at positions along the first and second sections of the track for maintaining the first and second rails in fixed relationship with respect to one another while permitting movement of the first and second carriage means on the first and second sections of track, respectively, without interference from the first and second arch braces; and wherein the first and second horizontal rails have a plurality of position defining holes extending therethrough and means having internal threads in coaxial alignment with the positioning holes, and wherein the first, second, third and fourth slides have positioning detent means for receiving an end of a positioning member inserted through selected holes of the plurality of holes in the rails, and wherein the positioning members are threaded bolts which are threadably inserted through the means having internal threads and the positioning holes to engage the detent means of the first, second, third and fourth slides.

11. A variable tread vehicle comprising:

a frame;

first and second parallel horizontal rails connected to the frame and extending transverse to a direction of movement of the vehicle to define a track; wherein the first and second rails comprise hollow tubes having generally rectangular cross-sections;

first movable carriage means movable on a first section of the track; the first movable carriage means comprising:

first and second slides of C-shaped cross-section surrounding inner sides of the first and second rails and partially surrounding upper and lower sides of the first and second rails, respectively, for slidable movement thereon;

first brace means attached to and extending between the first and second slides, the first brace means having a substantially vertical portion;

first internally threaded means carried by the substantially vertical portion of the first brace means; and first generally horizontal plate means attached to and extending between the first and second slides;

second movable carriage means movable on a second section of the track; the second movable carriage means comprising:

third and fourth slides of C-shaped cross-section surrounding inner sides of the first and second rails and partially surrounding upper and lower sides of the first and second rails, respectively, for slidable movement thereon;

second brace means attached to and extending between the third and fourth slides, the second brace means having a substantially vertical portion;

second internally threaded means carried by the substantially vertical portion of the second brace means; and second generally horizontal plate means attached to and extending between the third and fourth slides;

first drop axle means attached to the first and second slides and the first plate means of the first movable carriage means proximate its upper end and extending downward;

first gusset means attached to and extending between the first drop axle means and the first plate means;

second drop axle means attached to the third and fourth slides and the second plate means of the second movable carriage means proximate its upper end and extending downward;

second gusset means attached to and extending between the second drop axle means and the second plate means;

a first wheel connected to the first drop axle means proximate its lower end;

a second wheel connected to the second drop axle means proximate its lower end;

a first threaded drive shaft extending through the first internally threaded means for driving the first movable carriage means on the first section of the track;

a second threaded drive shaft extending through the second internally threaded means for driving the second movable carriage means on the second section of the track;

motor means for rotating the first and second shafts to move the first and second movable carriage means on the first and second sections of the track, and thereby vary the spacing between the first and second wheels; and first and second arch braces attached to and extending between the first and second rails at positions along the first and second sections of the track for maintaining the first and second rails in fixed relationship with respect to one another while permitting movement of the first, second, third and fourth slides the first and second carriage means on the first and second sections of track, respectively, beneath the first and second arch braces without interference from the first and second arch braces.

* * * * *